March 10, 1964 P. HENNINGER ETAL 3,123,895

METHOD OF AND DEVICE FOR MAKING A REGENERATIVE CAPACITOR

Filed April 20, 1961 2 Sheets-Sheet 1

March 10, 1964 P. HENNINGER ETAL 3,123,895

METHOD OF AND DEVICE FOR MAKING A REGENERATIVE CAPACITOR

Filed April 20, 1961

2 Sheets-Sheet 2

3,123,895

METHOD OF AND DEVICE FOR MAKING A REGENERATIVE CAPACITOR

Paul Henninger and Fritz Gaenge, Munich, Germany, assignors to Siemens & Halske Aktiengesellschaft, Berlin and Munich, Germany, a corporation of Germany Filed Apr. 20, 1961, Ser. No. 104,268
Claims priority, application Germany Apr. 22, 1960
8 Claims. (Cl. 29—25.42)

This invention is concerned with a method of and a device for making a regenerative capacitor with high space capacitance and having at the same time extraordinarily favorable electrical properties.

Two ways are known for obtaining a solution for the problems involved.

One way leads to the known varnish capacitor in which a carrier foil which is to serve as an electrode is provided with a varnish layer and thereupon metallized. However, such a varnish capacitor still requires considerable space because the carrier foil calls for dimensions which are quite large as compared with those of the varnish layer.

The other known way proposes to use for the production of capacitors with high space capacitance so-called thin-foil capacitors, very thin dielectric strips, about one to two microns thick. These thin foil strips are produced with the aid of a carrier made of paper or of a suitable synthetic material, which may be pretreated so as to ensure the desired adhesion and separability with respect to the thin foil strip to be produced, such carrier being provided with a thin varnish film which is by metallizing provided with an electrode layer, and the resulting metallized varnish film, forming the thin foil strip, is peeled off from the carrier directly before winding of the capacitor package.

However, it was found that all materials which might be considered for use as dielectrics, are not suitable for the production of the thin foils. Various dielectric materials, such for example as polystyrol, exhibit in the presence of slight mechanical stress such adhesive quality with respect to the thin foil, that they cannot be separated (peeled off) from the carrier foil without tearing apart. Accordingly, materials which are to be processed to produce thin foils, must have sufficient mechanical strength so as to form, even with the slight thickness amounting at the most to a few microns, a self-supporting foil, and the adhesive properties thereof, with respect to the carrier foil, must not be so strong as to preclude separation therefrom.

The problem posed involves the production of a regenerative capacitor, and it follows, therefore, the dielectric materials with poor regenerative properties cannot be employed in making a capacitor of the known thin foil type.

The drawback of thin foil capacitors resides, moreover, in low insulation resistance and relatively low breakdown strength. The surface of the thin foil are not completely smooth but show minute irregularities and pores. Upon metallizing these surfaces, metallic particles enter these pores, thereby producing peaks in the dielectric, which result in poor insulation resistance and considerably reduce the breakdown strength of the corresponding capacitor.

In order to permit the use of desired dielectric materials which may be processed to form varnish layers for thin-foil capacitors, while avoiding the above indicated disadvantages, the invention proposes a method according to which a first varnish layer is provided upon a suitable carrier foil, forming upon such first varnish layer a thin regenerative metal layer while leaving free a marginal strip, providing a second varnish layer upon the metal-layer corresponding in width to that of the first varnish layer, thereupon separating from the carrier foil the three-layer foil consisting of the two varnish layers and one metallic layer, and forming a capacitor from at least four such three-layer foils, which are stacked so that varnish layers of similar kind are disposed in engaging relationship, and interconnecting the metallic layers provided with corresponding marginal strips and with the exterior current leads so that the first varnish layers are disposed in the space which is free of the field while only the second varnish layers are dielectrically operatively effective.

Upon producing a capacitor, two successively disposed three-layer foils can be arranged laterally displaced with respect to two further three-layer foils. The contacting of the electrode layers is effected by providing metal layers at the ends of the capacitor package, which may be done by dipping, vaporizing or in other suitable manner. The desired connection between the electrode layers and the formation of areas which are free of the field, in which extend the first varnish layers, are automatically obtained owing to the partially mirror-like arrangement of the three-layer foils and the corresponding disposition of the free marginal strip-like areas of the electrode layers thereof. This gives the possibility of using for the operatively effective dielectric of the second varnish layer poorly regenerative but dielectrically highgrade materials, while using in the field-free space as the first varnish layer materials with good regenerative behavior, which, however, have frequently poor dielectric properties. A capacitor is in this manner obtained which also exhibits in addition to good regenerative behavior other good electrical properties.

Another advantage resides in the fact that the metal peaks which form incident to the provision of the metal layers are directed toward the field-free space, thus avoiding the objectionable effect of metal peaks in the dielectric and obtaining excellent insulation and breakdown strength of the capacitor produced.

The invention proposes another embodiment having increased contacting reliability, wherein a metal layer is provided upon the first varnish layer formed on the carrier foil, such metal layer being profiled and varnish tracks being formed thereon, so as to obtain by folding, along the median line of the metal layer, a six-layer foil the metal layers of which are already conductively interconnected, such six-layer foil being wound together with another similar six-layer foil to form a capacitor.

According to another advantageous feature of the invention, a plurality of parallel varnish tracks and metal electrode tracks are provided upon the carrier foil.

In the arrangement described so far, the dielectrically operatively effective layer as well as the layer lying in the field-free space between the electrodes, are made of two mutually superposed or stacked varnish layers.

In order to increase the space capacitance and to simplify the method of production, there may be provided upon the second varnish layer, a second regenerative metal layer which is laterally displaced with respect to the first metal layer, and to use for the winding of a capacitor package instead of the four three-layer foils, two four-layer foils each comprising two varnish layers and two metal layers, whereby the metal layers of one four-layer foil are arranged mirror-like with respect to those of the other foil.

The various objects and features of the invention will appear from the description of embodiments which is rendered below with reference to the accompanying drawings.

Figure 6:
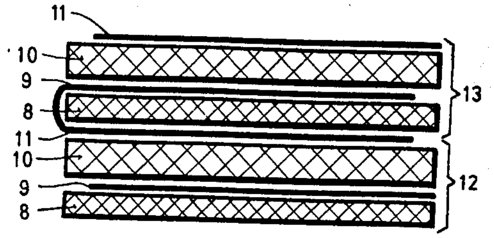
Figure 3:
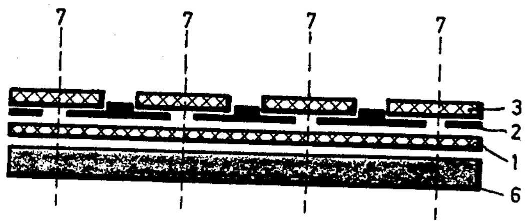
Figure 4:
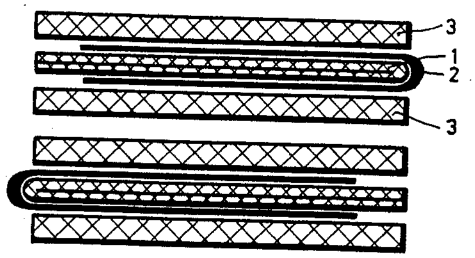
Figure 5:
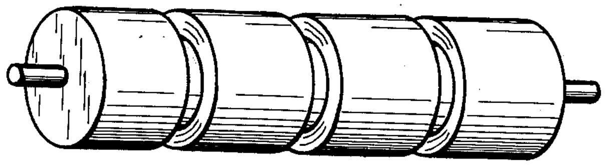

FIG. 3 indicates a carrier foil provided with a varnish layer upon which is placed a profiled metal coating;

FIG. 4 shows in sectional view how two folded foils are wound to form a wrapped capacitor;

FIG. 5 indicates a varnish-applying roller for providing the varnish tracks as, for example, in case of the foil shown in FIG. 4;

FIG. 6 represents in sectional view a winding layer of a capacitor formed of two four-layer foils.

Figure 1:
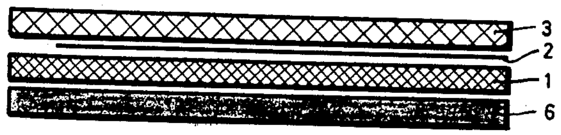
FIG. 1 is a cross sectional view of a three-layer foil made according to the invention.

As noted before, FIG. 1 shows in cross-sectional view a wrapped capacitor made in accordance with the invention. Upon a suitable carrier 6, made, for example, of wax paper or a suitable foil made of synthetic materials, is provided a first varnish layer 1 with a thickness amounting to fractions of a millimeter to a few thousands of a millimeter. This layer 1 can determine, for example, the regenerative properties of the capacitor. Upon the first varnish layer 1 is provided a metallized layer 2 upon which is placed a second varnish layer 3, the electrical properties of the varnish layer 3 corresponding to the purpose for which the capacitor is to be used. For example, if very low losses are demanded, a non-polarized dielectric as, for example, polystyrol is used for forming the layer 3.

Figure 2:
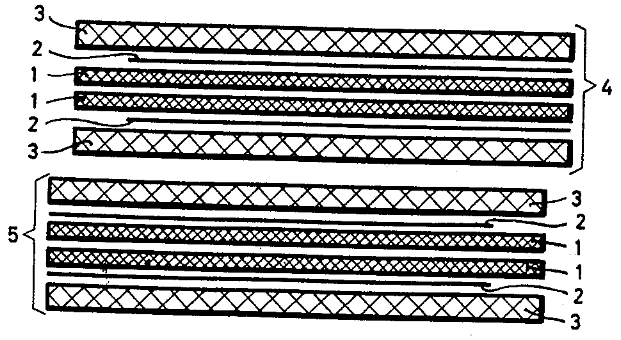
FIG. 2 shows in sectional view how the arrangement of a three-layer foil is combined with a second analogous arrangement to provide a wrapped capacitor.

The three-layer foil comprising the layers 1, 2, 3, is wound upon a supply reel together with the carrier 6 and is separated from the latter only directly before the winding or wrapping operation required to form a capacitor. The three-layer foil is then assembled with a second similarly produced foil having, however, a metallized layer 2 which is displaced with respect to the layer 2 of the first foil, the arrangement of the layers of the second foil being thus in a layer sequence which is mirror-like with respect to the layer sequence of the first foil, to form a combination 4 shown in FIG. 2, such combination 4 being joined with a second combination 5 which is analogously produced, for example, with appropriately displaced vaporization, and the two combinations 4 and 5 are in a single operation wound or wrapped and contacted to form a capacitor in which the dielectrics, that is, the second varnish layers 3 are disposed in the field-permeated space while the varnish layers 1 are disposed in the field-free space.

FIG. 3 shows a carrier foil 6 upon which is provided a first varnish layer 1, the latter being provided with profiled metal electrode layers 2, and upon the metal layers are placed varnish tracks 3, employing for this purpose, for example, a varnish-applying roller structure such as is illustrated in FIG. 5. The wide foil which is constructed of the various layers, is separated along the lines 7 indicated in FIG. 3, each section thus obtained forming a foil for producing a wrapped capacitor package. The corresponding foil, which is separated from the carrier, is now by means of a suitable device folded along the median line of the electrode layer 2 which coincides with the median line of the strip which is free of the dielectric. If desired, the folding may be carried out in the winding machine.

FIG. 4 shows the arrangement of the layers of two such folded foils wound to form a capacitor wrap. The metal layers 2 which protrude at the opposite ends and which may be thickened if desired, ensure unobjectionable inclusion of all winding turns incident to the contacting which may be effected by vaporization of metal layers.

FIG. 6 shows a winding layer of a capacitor made in accordance with a simplified procedure of two four-layer foils 12 and 13. Each such foil comprises a first varnish layer 8 upon which is provided a metal electrode layer 9, leaving a marginal strip-like area free, and upon the metal layer 9 is placed a second varnish layer 10 carrying a second metal layer 11 which is displaced with respect to the first metal layer 9, the regenerative metal layer 9 of the one four-layer foil 13 being conductively connected with the regeneration metal layer 11 of the other four-layer foil 11.

The capacitors produced according to the invention exhibit in addition to high space capacitance high insulation resistance and excellent regenerative properties. For example, capacitors produced with the dielectrically operative second varnish layer made of polystyrol showed at a capacitance of 0.25 $\mu f$. an insulation resistance of 100,000 $M\Omega/\mu f$. The electrical properties remained unaltered up to voltages amounting to 500 volts.

Changes may be made within the scope and spirit of the appended claims which define what is believed to be new and desired to have protected by Letters Patent.

We claim:

1. A method of making regenerative capacitors with high space capacitance comprising taking a suitable carrier foil, placing upon such carrier foil a first varnish layer, providing such first varnish layer with a relatively thin metal layer adapted for regenerative action while leaving a marginal strip-like area free, placing upon such metal layer a second varnish layer with a width thereof which corresponds to that of the first varnish layer, thereupon separating the carrier foil from the resulting three-layer foil consisting of two varnish layers and one metal layer, thereafter assembling at least four such three-layer foils to form a capacitor wherein similar varnish layers are disposed in mutual engagement, and wherein the metal layers with the respective marginal strip-like areas are mutually interconnected and contacted so as to dispose the respective first varnish layers in the field-free space while only the second varnish layers are dielectrically operative.

2. A method according to claim 1, comprising arranging two three-layer foils laterally displaced with respect to two other mutually stacked three-layer foils.

3. A method according to claim 1, comprising covering the ends of the wrapped capacitor package with contacting layers which respectively interconnect the metal layers of identical polarization.

4. A method according to claim 1, comprising providing the first varnish layer with a profiled metal electrode layer and the latter with profiled varnish tracks, folding the resulting foil upon itself along the median line of the metal layer to produce a six-layer foil the metal layers of which are thus interconnected, and winding the resulting six-layer foil together with a further similar six-layer foil to produce a capacitor.

5. A method according to claim 4, wherein a plurality of parallel extending varnish layers and cooperating metal layers are provided upon a carrier foil.

6. A method according to claim 1, comprising disposing upon the second varnish layer a second regenerative metal layer which is laterally displaced with respect to the first metal layer, and winding a capacitor package with the aid of an even number of the resulting four-layer foils each consisting of two varnish layers and two metal layers, whereby the metal layers of any four-layer foil are disposed mirror-like with respect to the adjacent four-layer foil.

7. A method according to claim 1, comprising forming the first varnish layer from a material having good regenerative properties, and forming the second varnish layer from a material having good electrical properties.

8. A method according to claim 7, comprising forming the second varnish layer from a polystyrol varnish.

References Cited in the file of this patent

UNITED STATES PATENTS

| | | |
|---|---|---|
| 2,389,018 | Ballard | Nov. 13, 1945 |
| 2,390,025 | Deyrup et al. | Nov. 27, 1945 |
| 2,399,798 | Grouse et al. | May 7, 1946 |